March 29, 1960 E. J. KOCHER ET AL Re. 24,802
REFRIGERATED HERMETICALLY SEALED MOTORS
Original Filed Aug. 26, 1957
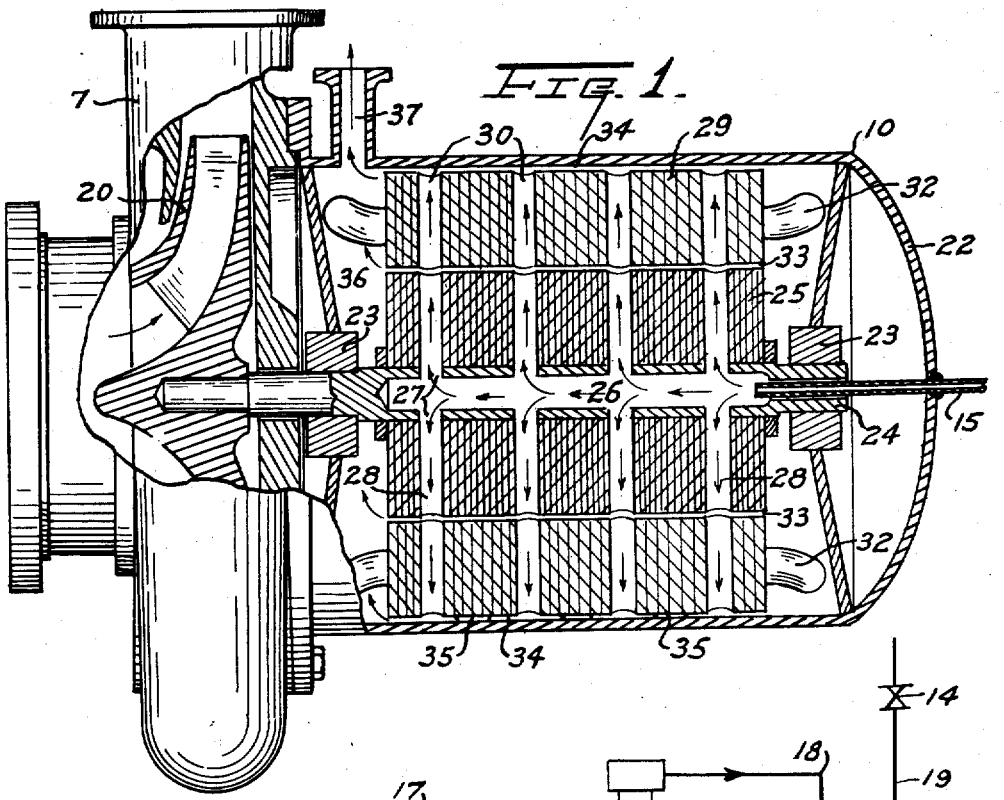
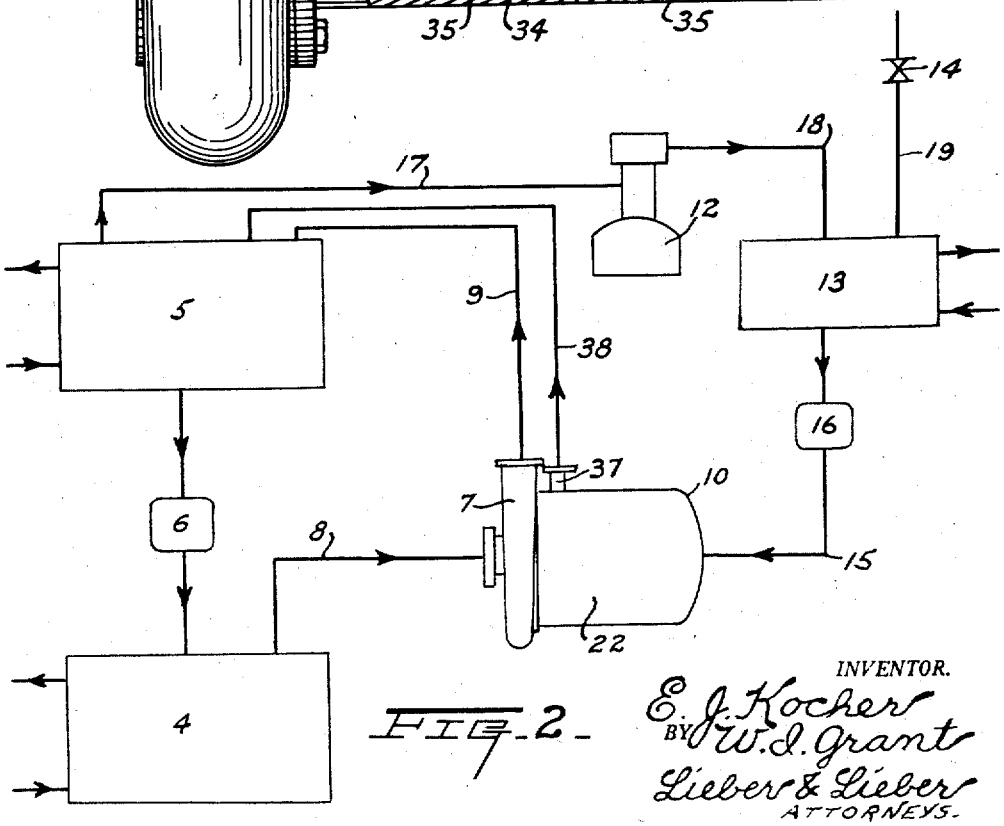
FIG. 2.
INVENTOR.
E. J. Kocher
BY W. J. Grant
Lieber & Lieber
ATTORNEYS.

United States Patent Office

Re. 24,802
Reissued Mar. 29, 1960

24,802

REFRIGERATED HERMETICALLY SEALED MOTORS

Erich J. Kocher, Milwaukee, and Whitney I. Grant, Mukwonago, Wis., assignors to The Vilter Manufacturing Co., Milwaukee, Wis., a corporation of Wisconsin Original No. 2,891,391, dated June 23, 1959, Serial No. 680,061, August 26, 1957. Application for reissue September 4, 1959, Serial No. 838,372

9 Claims. (Cl. 62—475)

Matter enclosed in heavy brackets [ ] appears in the original patent but forms no part of this reissue specification; matter printed in italics indicates the additions made by reissue.

The present invention relates in general to improvements in the art of refrigeration, and it relates more specifically to improvements in [low pressure] refrigerating systems employing refrigerant circulating pumps driven by hermetically sealed propelling motors and which utilize some of the refrigerant to cool these motors.

The primary object of this invention is to provide an improved refrigeration system which is simple in structure and efficient in operation.

Refrigerating systems which utilize low pressure refrigerants such as Freon 113, operate at pressures below atmospheric, so that there is always danger of having air enter the circulating system. If permitted to accumulate, this air ultimately increases the pressure in the condenser, and thus results in increased power consumption and decreased capacity, but such objectionable air accumulation can be obviated without wasting refrigerant by providing a so-called purging unit for automatically extracting and delivering the seepage air to the ambient atmosphere.

When employing an electric motor to drive the refrigerant circulating pump of a refrigerating system, it is also very desirable to prevent overheating of the motor and to effect cooling by utilizing some of the refrigerant being circulated through the system, since cooling of the motor by refrigeration eliminates the formation of scale and rust such as are deposited with water cooling. While it has heretofore been proposed to so utilize refrigerant confined within the circulating system by providing a hermetically sealed enclosure for the motor rotor and stator having therein a heat exchanger and a power consuming fan for circulating refrigerant gas from the motor through the heat exchanger and back to the motor, such a system is not only very complicated due to the enclosure of the heat exchanger and fan within the sealed casing, but also [because] it is impossible to prevent seepage of air into the system when operating with low pressure refrigerant such as Freon 113.

It is therefore an important and more specific object of the present invention to provide an improved refrigerating system operating with confined refrigerant below atmospheric pressure, and wherein an hermetically sealed electric motor is utilized to drive the refrigerant circulating pump and is most effectively cooled to prevent overheating.

Another important object of this invention is to provide an improved assemblage for constantly cooling a sealed motor used to propel a centrifugal circulating pump in a refrigerating system utilizing low pressure refrigerant, with the aid of air free refrigerant confined within the system.

A further important object of the invention is to provide an improved hermetically sealed electric motor structure for driving the circulating pump of a refrigeration system, and which is automatically cooled by utilizing some refrigerant from within the system without providing special heat exchange and refrigerant circulating fans or other complicated accessories within the motor enclosure, and with minimum power consumption.

Still another important object of our invention is to provide an improved cooling system in which low pressure refrigerant such as Freon 113 is confined and circulated through the circulating pump propelling motor, and which is constantly effectively purged for the removal of air which might leak into the sub-atmospheric system.

These and other more specific objects and advantages of the invention will be apparent from the following detailed description.

A clear conception of the features constituting the present improvement, and of the assemblage and functioning of a typical refrigeration system embodying the invention, may be had by referring to the drawing accompanying and forming a part of this specification wherein like reference characters designate the same or similar parts in the several views.

Fig. 1 is a somewhat diagrammatic part sectional side elevation of a rotary compressor driven by a hermetically sealed refrigerant cooled electric motor to circulate refrigerant through the improved system, the section having been taken longitudinally and centrally through the compressor and motor; and Fig. 2 is a simple diagram of an improved refrigeration system, purger unit and motor driven compressor, embodying the invention.

While the improvements have been shown and described herein as having been embodied in a simple refrigeration system comprising more or less standard condensers, valves and an evaporator, these elements may be varied to suit different conditions of operation without departing from the invention; and it is also contemplated that specific descriptive terms employed herein be given the broadest possible interpretation consistent with the disclosure.

Referring to Fig. 2 of the drawing, the refrigeration system shown diagrammatically therein, comprises in general, a refrigerant evaporator 4; a main refrigerant condenser 5 for liquifying and delivering low pressure liquid refrigerant to the evaporator 4, past a float controlled valve 6; an electric motor driven rotary compressor 7 having a suction line 8 communicating with the evaporator 4 and a refrigerant delivery line 9 connected to the condenser 5; and a purging assemblage or unit interposed between the main condenser 5 and the driving motor 10 of the compressor 7 for constantly removing leakage air from the entire system.

The purging unit for effecting automatic removal of air from the low pressure refrigerant confined in the system, consists primarily of a small capacity compressor 12; an auxiliary condenser 13; an air relief valve 14 associated with the condenser 13; and a liquid refrigerant discharge line 15 leading from the condenser 13 to the motor 10 and having a float controlled valve 16 therein. The small compressor 12 may be of any suitable type adapted to draw mixed refrigerant gas and air from within the top of the main condenser 5 through a conduit 17 and to deliver the mixture under pressure above atmospheric through a conduit 18 to the condenser 13 wherein the air is automatically released from the liquid refrigerant. The relief valve 14 is connected to the condenser 13 by a conduit 19 and is adapted to be set so as to open whenever a predetermined pressure above atmospheric has been reached in the condenser 13, and to thereby deliver the accumulated free air into the ambient atmosphere, while the condenser 13 is adapted to deliver liquid refrigerant through the discharge line 15 and past the float controlled valve 16 into the hermetically sealed main propelling motor 10 which drives the compressor impeller 20.

The electric motor 10 has a hermetically sealed casing 22 secured to the compressor housing and which is provided with internal spaced bearings 23 in which the pump impeller driving shaft 24 is journalled, and the motor rotor 25 is secured to this shaft 24 between these bearings 23, see Fig. 1. The shaft 24 has an internal central passage 26 in open communication with the liquid refrigerant line 15 beyond the float controlled valve 16, and which is provided with local outlet openings 27 communicating with outwardly directed passages or radial conduits 28 formed in the rotor 25, and this rotor is embraced by the annular motor stator 29 which also has outwardly directed passages or radial conduits 30 formed therein and which are alineable with the rotor conduits 28 when the motor is operating.

The motor stator 29 is also provided with the usual energizing windings 32 and is separated from the motor rotor 25 by a slight annular space 33 and from the annular outer wall of the casing 22 by a similar space 34 which is interrupted only by local peripheral supporting pads 35 for the stator 29 coacting with the outer casing wall. These annular spaces 33, 34 communicate with the conduits 28, 30 and with a sealed end chamber 36 confined within the casing 22, and this chamber has an outlet 37 for vaporized refrigerant connected by a discharge line 38 with the condensing chamber of the main condenser 5.

The evaporator 4, condensers 5, 13, compressor 12, float controlled valves 6, 16, and adjustable air relief valve 14 are all of well known construction, and the evaporator 4 and the condensers 5, 13 have the usual heat transfer connections communicating therewith as depicted in the diagram of Fig. 2.

When the various parts of the improved refrigerating system have been properly constructed and asembled as illustrated, and the system has been supplied with low pressure refrigerant such as Freon 113, its normal operation is as follows. The motor 10 is rotating to drive the main compressor impeller 20 thereby causing this impeller to withdraw gaseous refrigerant by suction from the evaporator 4 through the inlet line 8 and to deliver this refrigerant gas through the main compressor discharge line 9 into the main condenser 5. In the condenser 5 the major portion of this refrigerant is promptly liquified or condensed and the liquid refrigerant is returned as required to the evaporator 4 past the float controlled valve 6.

While the main evaporator 4, compressor 7, condenser 5, and float valve 6 are thus functioning, some free air is bound to leak or seep into the low pressure refrigerant circulating system, and this entering air rises to the top of the main condenser 5. The auxiliary compressor 12 will then function to constantly withdraw the seepage air mixed with gasified refrigerant from within the condenser 5 through the conduit 17, and to compress the mixture to a pressure above atmospheric and will deliver the compressed mixture through the conduit 18 into the auxiliary condenser 13. The air thus admitted to the condenser 13 is released while the refrigerant is being liquified or condensed, and the free air is withdrawn and escapes through the duct 19 and relief valve 14 to the surrounding atmosphere, while the condensed liquid refrigerant flows through the discharge line 15 as required past the float controlled valve 16 and line 15 and is delivered into the motor 10.

As this liquid refrigerant flows from the conducting line 15 into the hermetically sealed motor casing 22 and through the central shaft passage 26, the centrifugal force generated by the rapidly revolving rotor 25, withdraws refrigerant through the shaft openings 27 and radial conduits 28 and delivers this refrigerant through the stator conduits 30 and through the annular spaces 33, 34 into the chamber 36. The heat generated by the revolving rotor 25 and its shaft 24 rapidly vaporizes the refrigerant flowing through the conduits 28, 30 and through the annular spaces 33, 34 and thereby effectively cools the motor 10, and the gasified refrigerant entering the sealed chamber 36 escapes through the outlet 37 and is delivered into the main condenser 5 through the discharge line 38 to mingle with the refrigerant being circulated through this condenser 5 by the main compressor impeller 20.

After initial proper installation and adjustment the entire system functions automatically to purge the refrigerant and to supply the evaporator 4 and the motor 10 with abundant supplies of air free liquid refrigerant. The hermetically sealed motor 10 which drives the main refrigerant circulating compressor 7 is most effectively cooled with minimum power consumption and without the aid of special power consuming fans and complicated heat exchangers confined within its casing 22, and no special seals are required between the motor 10 and the compressor impeller 20 since any refrigerant which may escape from the motor casing 22 into this compressor 7 will be delivered into the main condenser 5. The improved hermetically sealed motor 10 is obviously simple, compact and durable in construction, and the refrigerant supply line 15 may be welded to the end head of the casing 22 as in Fig. 1 in order to eliminate possible air ingress at this point. *In systems wherein the purging unit is eliminated, condensed refrigerant may be drawn from the discharge line leading from the main condenser 5 to the evaporator 4 and bypassed to the motor 10, but in any case, condensed liquid refrigerant is used in cooling the motor.*

It should be understood that it is not desired to limit this invention to the exact details of construction and operation of the system and parts herein specifically shown and described, for various modifications within the scope of the appended claims may occur to persons skilled in the art.

We claim:

1. In a refrigerating system operating with confined refrigerant below atmospheric pressure, an evaporator for the refrigerant, a refrigerant condenser cooperable with said evaporator, a compressor having an impeller for withdrawing refrigerant from said evaporator and for delivering the same into said condenser, an electric motor having a rotor drivingly connected to said compressor impeller and a stator embracing its rotor and being provided with a hermetically sealed casing enclosing said rotor and stator, said motor rotor being provided with a central refrigerant inlet passage and both said rotor and stator having therein alineable conduits extending outwardly from said central rotor inlet passage and said casing having a refrigerant outlet communicating with said condenser, a purging unit for removing air from the confined refrigerant being circulated through said condenser and evaporator by said compressor, and means for conducting purged refrigerant from said unit into said central rotor passage.

2. In a refrigerating system operating with confined refrigerant below atmospheric pressure, an evaporator for the refrigerant, a refrigerant condenser cooperable with said evaporator, a compressor having an impeller for withdrawing refrigerant from said evaporator and for delivering the same into said condenser, an electric motor having a rotor drivingly connected to said compressor impeller and a stator embracing but spaced from its rotor and being provided with a hermetically sealed casing enclosing said rotor and stator, said motor rotor being provided with a central refrigerant inlet passage and both said rotor and stator having therein alineable radial conduits extending outwardly from said central rotor inlet passage and said casing having a refrigerant outlet communicating with said condenser, a purging unit communicating with said condenser and being operable to remove air from the confined refrigerant being circulated through said condenser and evaporator by said compressor, and conduit means for conducting air free refrigerant from said unit into said central rotor passage.

3. In a refrigerating system operating with confined refrigerant below atmospheric pressure, an evaporator for the refrigerant, a refrigerant condenser cooperable with said evaporator, a compressor having an impeller for withdrawing refrigerant from said evaporator and for delivering the same into said condenser, an electric motor having a rotor drivingly connected to said compressor impeller and an annular stator surrounding but spaced from its rotor and being provided with a hermetically sealed casing enclosing its rotor and stator, said motor rotor being provided with a central refrigerant inlet passage extending approximately throughout the entire length and said rotor and stator having alineable conduits radiating from said passage and said casing having a refrigerant outlet communicating with said condenser, a purging unit for removing air from the confined refrigerant withdrawn from the top of said condenser, and means for conducting refrigerant from said unit into one end of said central rotor passage.

4. In a refrigerating system operating with confined refrigerant below atmospheric pressure, an evaporator for the refrigerant, a main refrigerant condenser cooperable with said evaporator, a main compressor having an impeller for withdrawing refrigerant from said evaporator and for delivering the same into said condenser, an electric motor having a rotor drivingly connected to said compressor impeller and a stator embracing its rotor and being provided with a hermetically sealed casing enclosing said rotor and stator, said motor rotor being provided with a refrigerant inlet passage extending approximately throughout the entire length and said rotor and stator having several sets of alineable conduits radiating outwardly from said passage and said casing having a refrigerant outlet communicating with said passages and said condenser, a purging unit having an auxiliary compressor communicating with said condenser and also having an auxiliary condenser and a relief valve operable to remove air from the confined refrigerant being circulated through said main condenser and evaporator, and conduit means for conducting purged refrigerant from said unit into said central rotor inlet passage.

5. In a refrigerating system operating with confined refrigerant below atmospheric pressure, an evaporator for the refrigerant, a refrigerant condenser cooperable with said evaporator, a compressor having a rotary impeller for withdrawing refrigerant from said evaporator and for delivering the same into said condenser, an electric motor having a rotor drivingly connected to said compressor impeller and an annular stator surrounding said rotor and being provided with a hermetically sealed casing enclosing said rotor and stator, said motor rotor being provided with a single central refrigerant inlet passage and said rotor and stator having several sets of alineable conduits communicating with and radiating from said inlet passage, and said stator being separated from said rotor and casing by annular spaces communicating with said condenser and with said conduits, a purging unit communicating with said condenser and being operable to remove air from the confined refrigerant being circulated through the condenser and evaporator by said compressor, and conduit means for conducting purged refrigerant from said unit into one end of said central rotor passage.

6. In a refrigerating system operating with confined refrigerant below atmospheric pressure, an evaporator for the refrigerant, a refrigerant condenser cooperable with said evaporator, a compressor having an impeller for withdrawing refrigerant from said evaporator and for delivering the same into said condenser, an electric motor having a rotor drivingly connected to said compressor impeller and a stator embracing its rotor and being provided with a hermetically sealed casing enclosing said rotor and stator, said [rotor] *motor* rotor being provided with a central refrigerant inlet passage and said rotor and stator having therein several laterally spaced sets of alineable conduits radiating from said inlet passage, and said stator being separated from said rotor and casing by annular spaces communicating with said conduits and said condenser, and means for conducting [motor] *purged* refrigerant from said condenser into one end of said central rotor passage.

7. In a refrigerating system having an evaporator and a main condenser cooperable therewith and being provided with a purging unit operable to remove air from the refrigerant confined within the system, a compressor having a rotary impeller for withdrawing refrigerant from the condenser and for delivering the same into the evaporator, and an electric motor having a rotor drivingly connected directly to said compressor impeller and a stator surrounding the rotor, said motor rotor and stator being confined in a hermetically sealed casing having a refrigerant inlet connected to the purging unit and an outlet connected to the evaporator and said motor rotor being provided with a coaxial passage communicating with said casing inlet while both said rotor and stator have therein alineable conduits radiating from said passage and connecting the latter with said casing outlet.

*8. In a refrigerating system having an evaporator and a condenser cooperable therewith, a compressor for withdrawing refrigerant from the evaporator and for delivering the same into the condenser, and an electric motor having a rotor drivingly connected to said compressor and a stator surrounding said rotor, said motor rotor and stator being confined in a hermetically sealed casing having a refrigerant inlet connected to the liquid side of the condesnser and an outlet connected back into the refrigerant system, and said motor rotor being provided with a coaxial liquid refrigerant passage communicating with said casing inlet while both said rotor and stator have therein alineable refrigerant conduits radiating from said passage and connecting the latter with said casing outlet.*

*9. In a refrigerating system having an evaporator and a condenser cooperable therewith, a compressor for withdrawing refrigerant from the evaportor and for delivering the same into the condenser, an electric motor having a rotor drivingly connected to said compressor and a stator embracing its rotor and being provided with a hermetically sealed casing enclosing said rotor and stator, said motor rotor being provided with a central refrigerant inlet passage and said rotor and stator having therein several laterally spaced sets of alineable conduits radiating from said inlet passage, and said stator being separated from said rotor and casing by annular spaces communicating with said conduits, and means for conducting refrigerant from the liquid side of said condenser into one end of said central rotor passage.*

References Cited in the file of this patent or the original patent

UNITED STATES PATENTS

| | | |
|---|---|---|
| 1,691,696 | Baum | Nov. 13, 1928 |
| 2,249,882 | Buchanan | July 22, 1941 |
| 2,400,620 | Zwickl | May 21, 1946 |
| 2,746,269 | Moody | May 22, 1956 |
| 2,780,737 | Labastie et al. | Feb. 5, 1957 |
| 2,793,506 | Moody | May 20, 1957 |